No. 668,733. Patented Feb. 26, 1901.
P. S. GRIFFITH.
PNEUMATIC TIRE.
(Application filed June 1, 1900.)

(No Model.)

WITNESSES:
M. L. Cilley.
Geo. Griffith.

INVENTOR.
Phares S. Griffith
BY Detrict J. Cilley
ATTORNEY.

UNITED STATES PATENT OFFICE.

PHARES S. GRIFFITH, OF GRAND RAPIDS, MICHIGAN, ASSIGNOR OF ONE-HALF TO ROSE BACHMAN, OF SAME PLACE.

PNEUMATIC TIRE.

SPECIFICATION forming part of Letters Patent No. 668,733, dated February 26, 1901.

Application filed June 1, 1900. Serial No. 18,778. (No model.)

*To all whom it may concern:*

Be it known that I, PHARES S. GRIFFITH, a citizen of the United States, residing at Grand Rapids, in the county of Kent and State of Michigan, have invented certain new and useful Improvements in Pneumatic Tires, of which the following is a specification.

My invention relates to improvements in the bicycle-tire patented to me October 31, 1899, and numbered 625,929; and its object is to apply the fibrous filling in single-tube pneumatic tires in such a manner as not to materially increase the weight of the tire and at the same time to render the "tread" of the tire practically non-puncturable. I attain this object by the mechanism illustrated in the accompanying drawings, in which—

Figure 1:
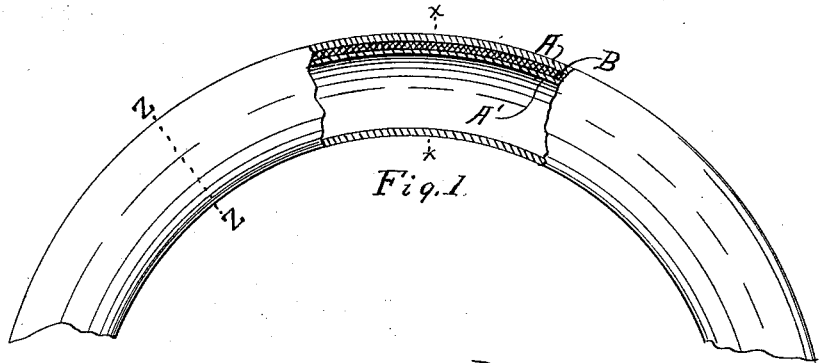
Figure 2:
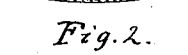
Figure 3:
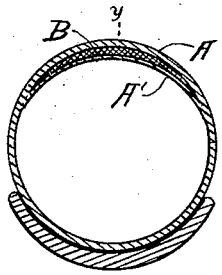
Figure 4:
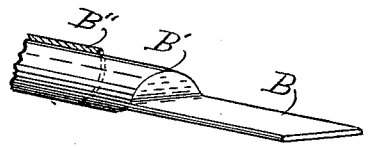

Figure 1 is a section of a tire with a portion of one side cut away, as on the line $y\ y$ of Fig. 3. Fig. 2 is a transverse section of the prepared fiber on the line $x\ x$ of Fig. 1. Fig. 3 is a transverse section of a tire on the line $z\ z$ of Fig. 1, and Fig. 4 shows the manner of preparing the cornstalk or fiber for use in the tire.

Similar letters refer to similar parts throughout the several views.

In the construction of this tire I prefer the use of the pith from cornstalks, as it is light, resilient, and has the peculiar property of preventing the passage of sharp instruments, as nails, &c., through the rubber which covers it, though other substances may be used with good effect.

In preparing the cornstalk-pith I first strip the outer shell B'', which leaves the round pith B'. This I pass between heavy rollers to reduce it to a flat compact form, as shown at B in Fig. 4. I then form the prepared fiber substantially as shown in Fig. 2 and inclose it in a fabric case, as $b$, for which I prefer to use a material known as "friction-cloth," which is prepared with a rubber sizing and can be readily vulcanized to the surface of the tire, and thus save the trouble and expense of vulcanizing the inner strip A', which ordinarily should be placed in the tire, substantially as shown in Fig. 3, so that a tube is formed for the reception of the fiber, pulp, or whatever may be inserted in the tire A.

Having thus fully described my invention, what I claim as new, and desire to secure by Letters Patent of the United States, is—

1. As a new article of manufacture, a tire consisting of a pneumatic tire, compressed cornstalk-pith and prepared fabric in an air-tight space within the tire and adjacent the tread thereof, substantially as and for the purpose set forth.

2. As a new article of manufacture, a pneumatic tire consisting of a single-tube rubber tire, and compressed cornstalk-pith prepared and placed within the tire in an air-tight compartment circumferential of and adjacent the tread of the tire, substantially as and for the purpose set forth.

3. As a new article of manufacture, a tire consisting of a single-tube rubber tire and compressed cornstalk-pith encased in friction-cloth and the cloth vulcanized to the inner surface of the tire to form an air-tight chamber for the pith, substantially as and for the purpose set forth.

Signed at Grand Rapids, Michigan, May 26, 1900.

PHARES S. GRIFFITH.

In presence of—
 LOUIE CILLEY,
 ITHIEL J. CILLEY.